Sept. 25, 1956  H. P. MIXER  2,764,345
SUPPLEMENTAL DATA ENTERING MECHANISM FOR TABULATORS OR THE LIKE
Filed Oct. 16, 1953  5 Sheets-Sheet 3
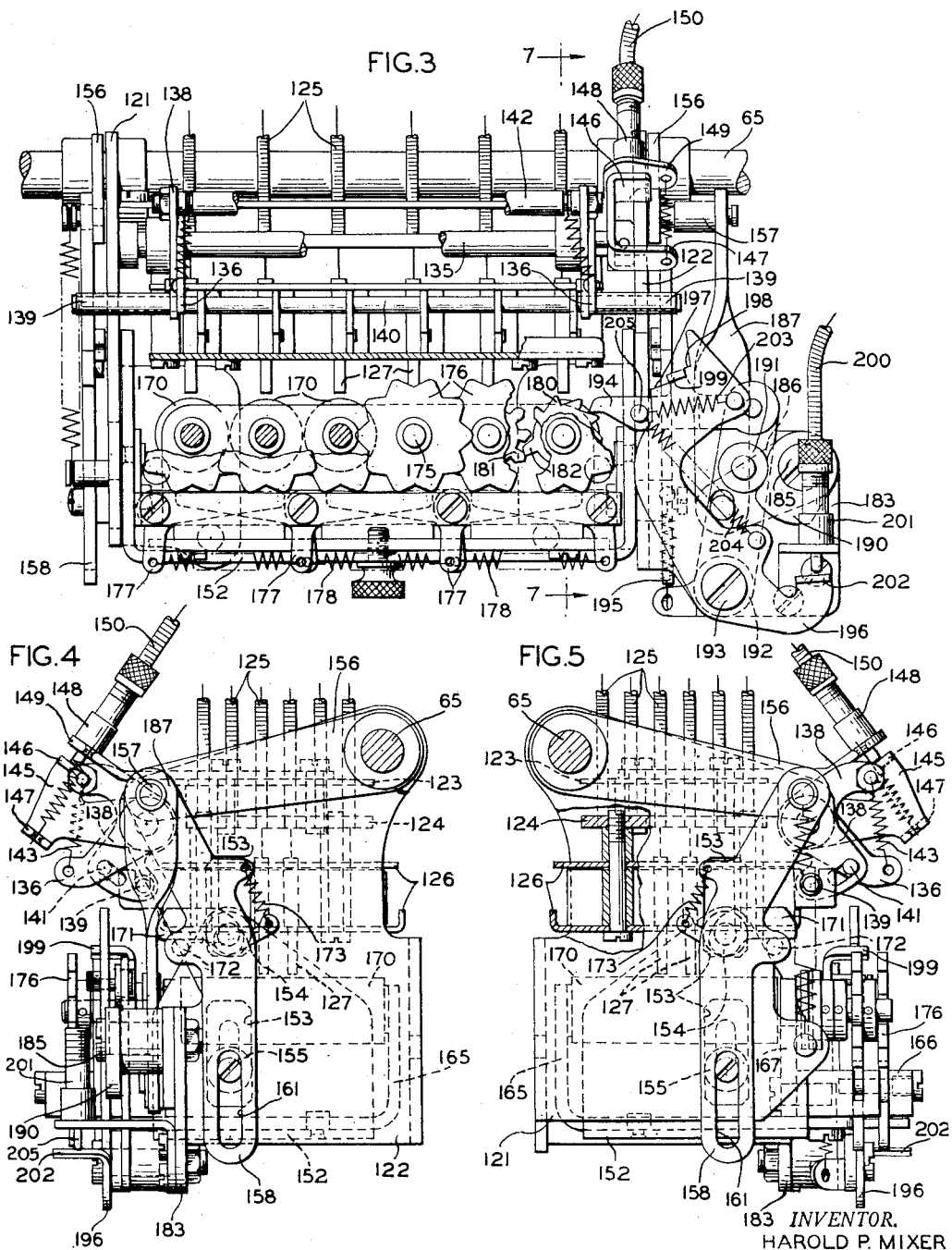
INVENTOR.
HAROLD P. MIXER
BY George V. Eltgroth
Jn. L. Sterling
ATTORNEYS Sept. 25, 1956  H. P. MIXER  2,764,345
SUPPLEMENTAL DATA ENTERING MECHANISM FOR TABULATORS OR THE LIKE
Filed Oct. 16, 1953  5 Sheets-Sheet 4
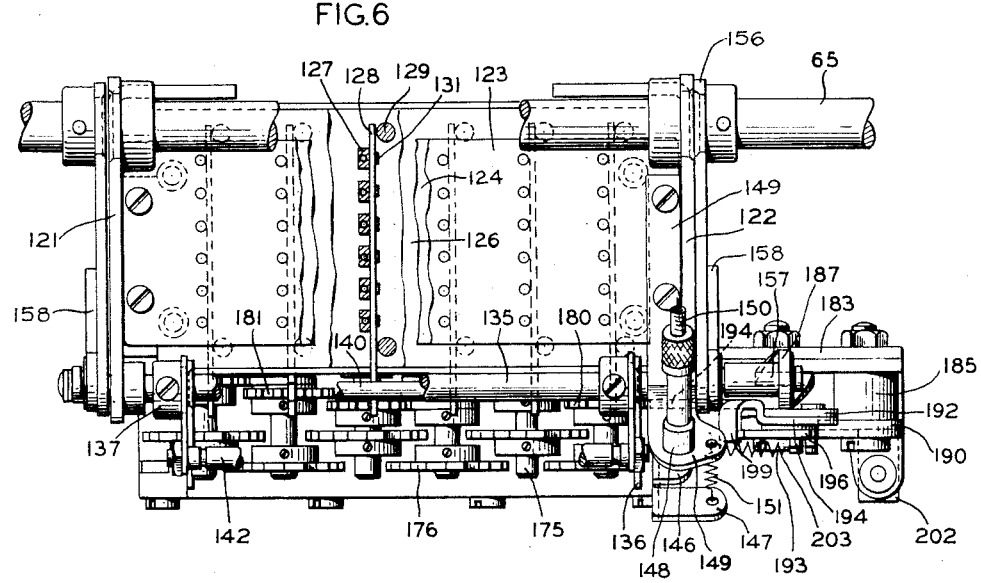
INVENTOR.
HAROLD P. MIXER
BY George V. Eltgroth
J. L. Sterling
ATTORNEYS Sept. 25, 1956
H. P. MIXER
2,764,345
SUPPLEMENTAL DATA ENTERING MECHANISM FOR TABULATORS OR THE LIKE
Filed Oct. 16, 1953
5 Sheets-Sheet 5
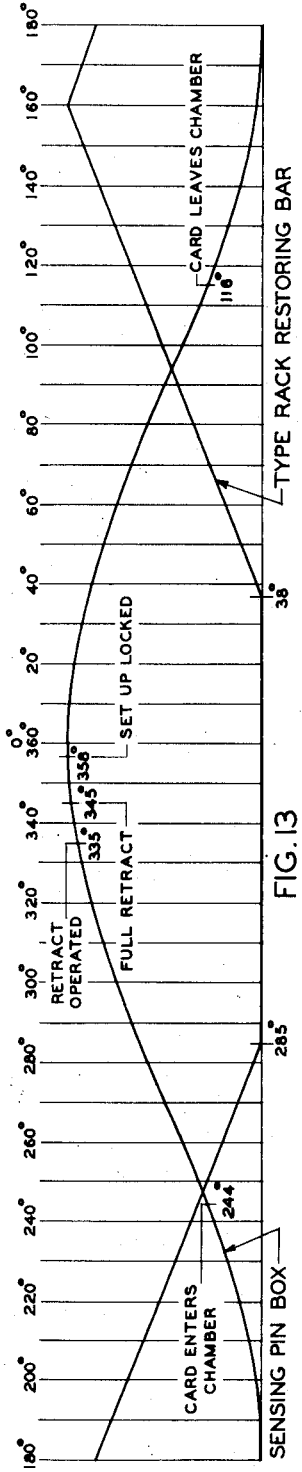
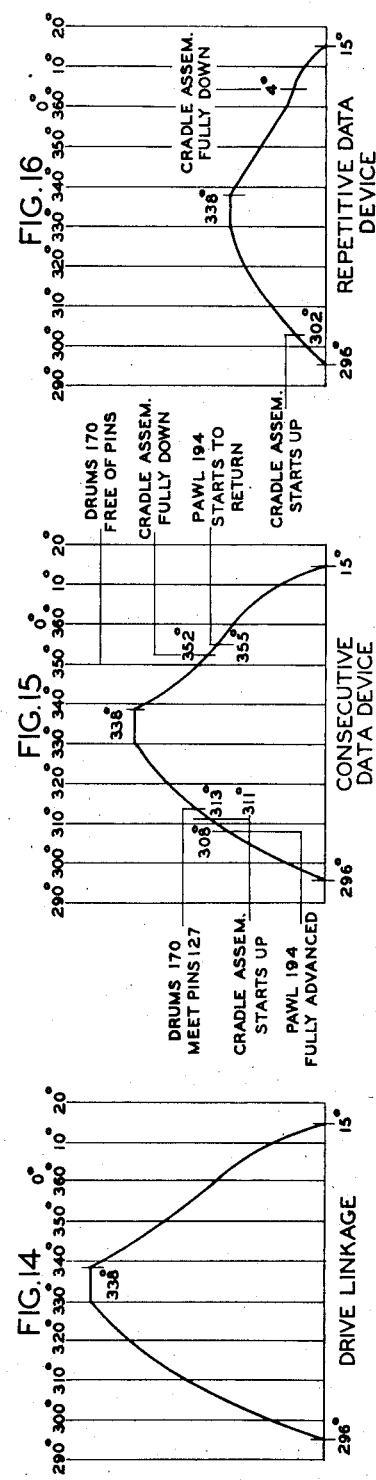
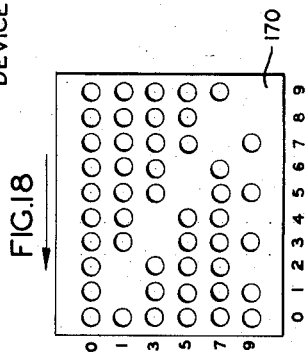
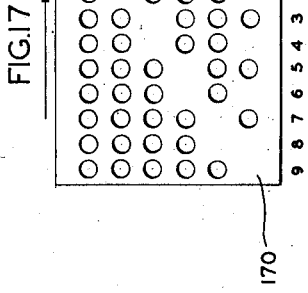
*INVENTOR.*
HAROLD P. MIXER
BY George V. Eltgroth
John L. Sterling
ATTORNEYS

United States Patent Office 2,764,345
Patented Sept. 25, 1956

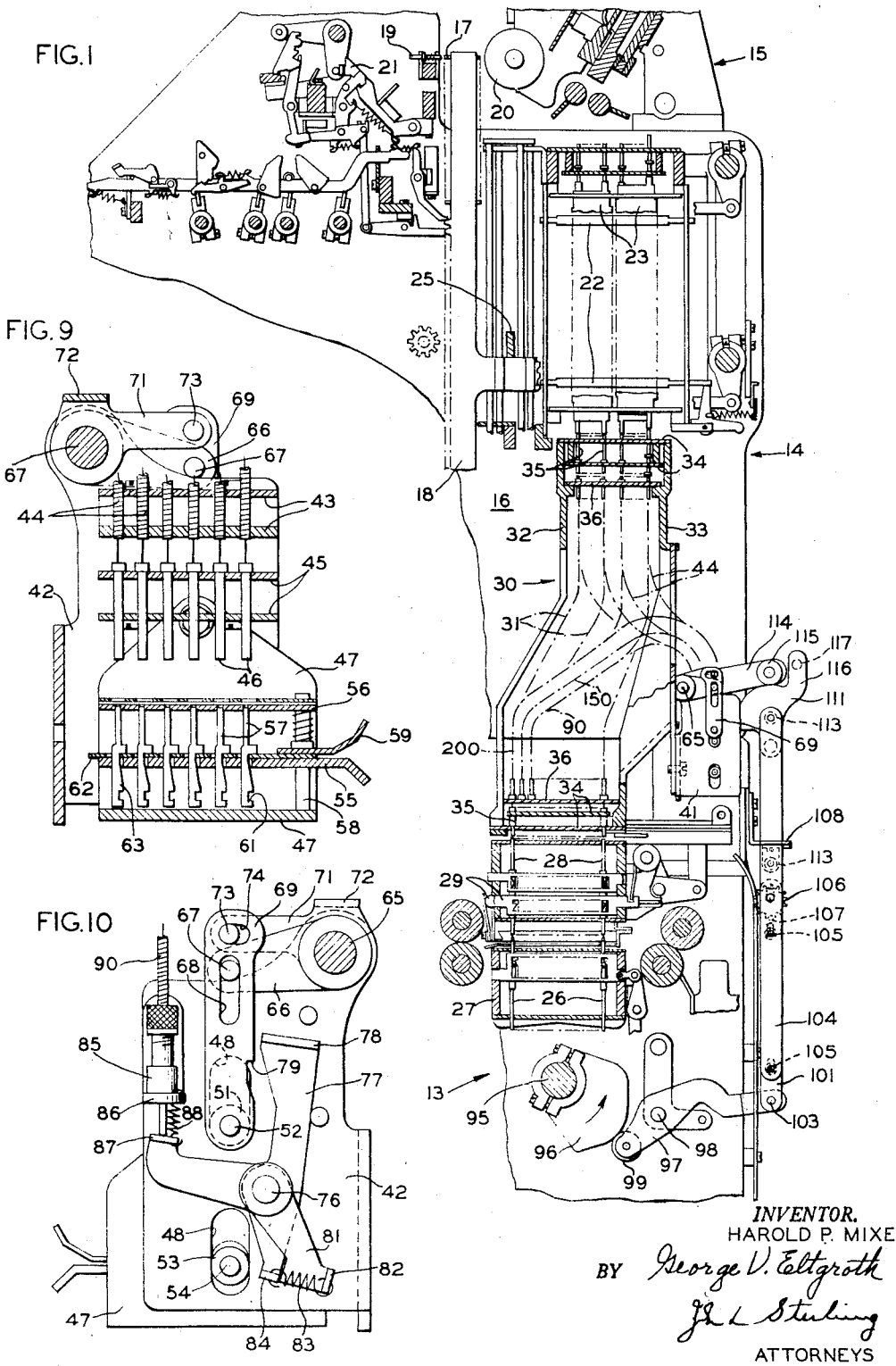
Sept. 25, 1956    H. P. MIXER    2,764,345
SUPPLEMENTAL DATA ENTERING MECHANISM FOR TABULATORS OR THE LIKE
Filed Oct. 16, 1953      5 Sheets-Sheet 1
*INVENTOR.*
HAROLD P. MIXER
BY George V. Eltgroth
J. L. Sterling
ATTORNEYS

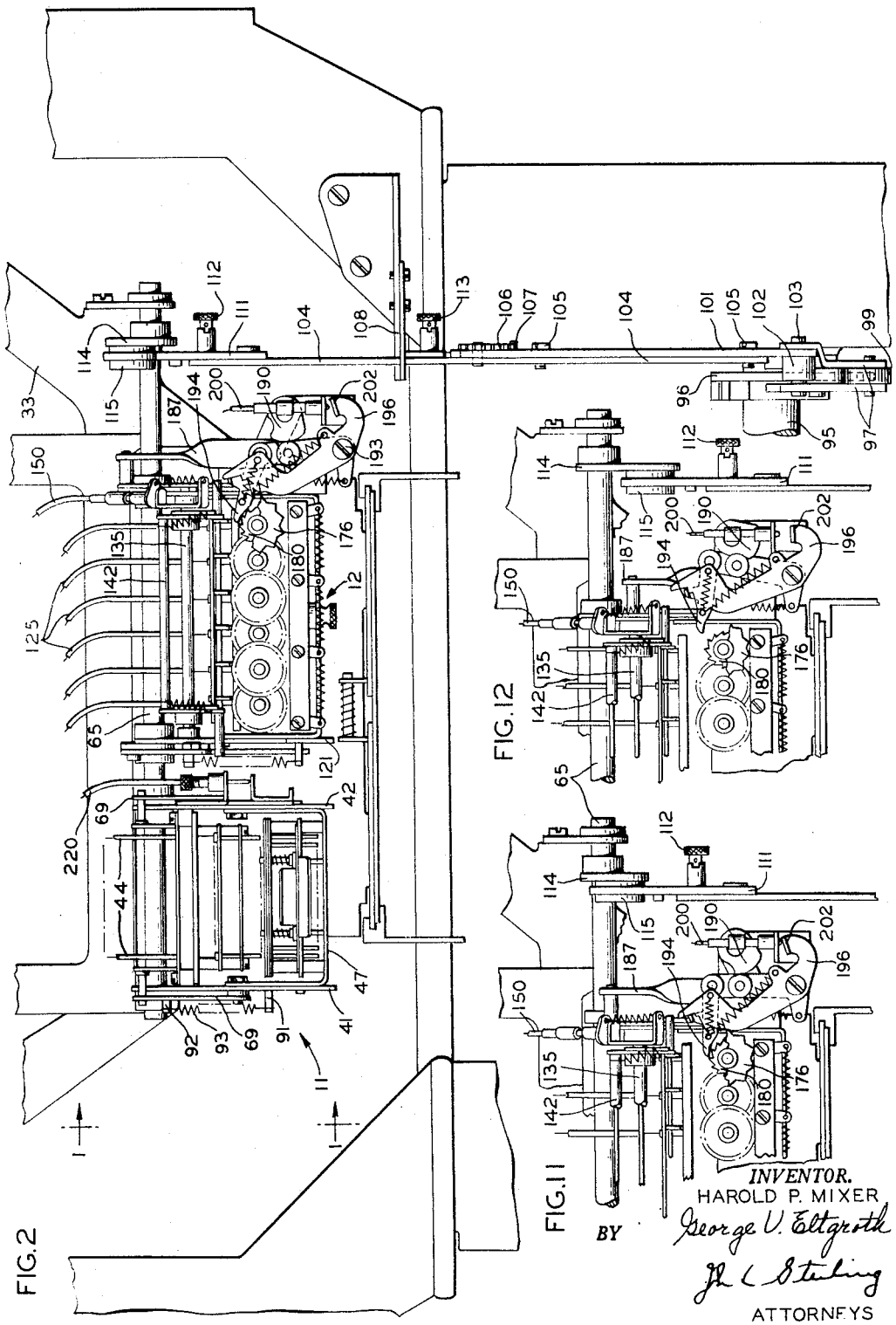

2,764,345

SUPPLEMENTAL DATA ENTERING MECHANISM FOR TABULATORS OR THE LIKE

Harold P. Mixer, South Norwalk, Conn., assignor to Sperry Rand Corporation, a corporation of Delaware Application October 16, 1953, Serial No. 386,442

17 Claims. (Cl. 235—61.6)

This invention relates to record controlled accounting machines, and has more particular reference to an improvement by which data sensed in one or more predetermined record areas at one time to control the printing punching, or translating of such data into a related form, may be supplemented by data preset in the machine and entered at appropriate times along with said data sensed from a record. Said supplemental data may be data of either a repetitive or consecutive nature and either manually or automatically set up in the machine to be entered at appropriate times to control the operation of the machine in accordance therewith. The features of the invention are adapted for use in record controlled accounting machines generally, the particular embodiment herein shown being especially designed for use in record controlled tabulating and like machines.

One object of the invention is to enable the selective entry at predetermined times in an accounting machine operation of informative data in addition to that represented by the usual pattern representations of a sensed record.

An additional object is to reduce the number of sensed pattern representations heretofore required to attain a given machine operation.

A further object is to increase beyond the normal capacity of a machine sensing section the amount of informative data obtainable by a machine from such a sensing section.

A still further object is to permit the entry under record control of supplementary repetitive data and/or consecutive data at appropriate times and concomitantly with the entry of data sensed in the controlling record.

In many forms of accounting machine operations there are often certain items of data common to a plurality of the records being sensed and which accordingly are repeatedly entered in the machine throughout the operation. For example, when a card controlled tabulator is set up and used for posting customers' bills, items common to a plurality of cards would be the date of the bill, a standard fixed service charge, or a similar item any one of which items remains constant for each customer and heretofore was required to be repeatedly punched in an appropriate card pertaining to each customer's account. Also, in such operations there are often certain items of data desired to be entered in consecutive relationship to the records being sensed and which accordingly are entered in sequence in the machine throughout the operation. For example, when a card controlled tabulator is set up and used for posting customers' bills, items in sequence to a plurality of cards would be a reference number, account number, or a similar item any one of which items follows a predetermined sequential order and heretofore was required to be punched in appropriate cards pertaining to each customer's account.

In practice, such supplemental data could be punched either in a punch field reserved for that purpose in a specified card pertaining to the account, or else in a special card inserted in proper sequence among the usual cards pertaining to each account. In either case, such data, in order to be included in the tabulation, must have been represented by a perforation pattern in a card. Through the novel means herein disclosed, any data within the capacity of the device, such as a date, service charge, or number can be set up in the machine and entered at appropriate preselected times in the type bar positioning mechanism of the machine. By so providing, the necessity for separately punching such data for each account is herein eliminated, enabling use of the greater portion of the punch field of the card, heretofore required to be reserved for such data for other purposes. The device is brought into operation under control of special perforations in a card and at various times depending upon the requirements of the work. One of said perforations controls only the means for stepping the device to set up data next in sequential order so as to enable control thereof regardless of the entry of such data.

As will be seen from a reading of the following description, tabulation of the repetitive matter and/or sequential matter is effected through some of the regular type bars of the machine, which selected type bars may be used in other runs of cards or in other cycles of the same run of cards for printing and accumulating, in the usual manner, data represented by perforation patterns in the sensed cards.

Other objects and structural details of the invention will be apparent from the following description when read in connection with the accompanying drawing, wherein Fig. 1 is a right-hand sectional view of a tabulator illustrating the relative location of the mechanism according to the invention and the means by which it is driven;

Fig. 2 is a rear elevation of a portion of the mechanism shown in Fig. 1;

Fig. 3 is a detailed rear elevation in enlarged scale of the consecutive data set-up mechanism showing the stepping mechanism therefor in an operative position resulting from the occurrence of a control signal thereto;

Fig. 4 is a view of the mechanism shown in Fig. 3 viewed from the left-hand side of the machine;

Fig. 5 is an elevation of the mechanism shown in Fig. 3 and viewed from the right-hand side of the machine;

Fig. 6 is a plan view of the mechanism shown in Fig. 3;

Fig. 7 is a sectional view of the consecutive data set-up mechanism taken along the line 7—7 of Fig. 3 showing the locking slide retract mechanism in a position resulting from the absence of a control signal thereto;

Fig. 8 is a view similar to Fig. 7, but showing the locking slide retract mechanism in the operative position resulting from the occurrence of a control signal thereto;

Fig. 9 is a sectional view to the repetitive data set-up mechanism taken along the line 9—9 of Fig. 3;

Fig. 10 is a side elevation of the repetitive data set-up mechanism taken from the left-hand side thereof, and showing the latching means therefor in its ineffective position resulting from the absence of a control signal thereto;

Figs. 11 and 12 are views of the portion of the mechanism shown in Fig. 3 illustrating different operative positions of the consecutive data stepping mechanism resulting from the absence of a control signal thereto;

Fig. 13 is a diagram illustrating the timing of the sensing mechanism, and the type bar restoring mechanism of the tabulating machine;

Figs. 14, 15 and 16 are diagrams illustrating the timing of the driving linkage common to both the consecutive data mechanism and the repetitive data mechanism, the consecutive data cradle assembly, and the repetitive data cradle assembly, respectively; and Figs. 17 and 18 are flat lay-outs of the perforated drums employed in setting up the consecutive data to be entered.

The invention is hereby disclosed in an embodiment adapted for a punched card tabulator of the well known Powers type, as shown and described in a patent to John Mueller, 2,381,361 issued August 7, 1945; and, as so applied, it consists chiefly of improvements on or additions to the mechanism disclosed in patent to John Mueller No. 2,516,014, issued July 18, 1950.

As disclosed herein, the invention comprises a mechanism for entering presettable data of a repetitive nature, hereinafter called the repetitive data device, and indicated generally 11, and mechanism for entering data of consecutive nature, hereinafter called the consecutive data device and indicated generally 12. It will be understood that the control function associated with the repetitive data device will permit entry or non-entry of the preset data into the machine, while one control function associated with the consecutive data device will permit indexing or non-indexing of the related mechanism to the next item in sequence of consecutive data and a second control function associated with the consecutive data device will permit entry or non-entry of the selected data into the machine.

The tabulating machine to which the invention is shown applied will be described only in so far as is necessary to an understanding of the invention, reference being made to the above cited Patent 2,381,361 for a more complete description thereof. Said machine is made in two principal parts, a base section 13 and a head section 14, the latter supporting a paper carriage 15 (Fig. 1).

As can be seen in Fig. 1, and as more fully described and shown in the aforesaid patent, the tabulator head section includes a supporting cast frame 16, printing being effected from a row of type 17 carried by each of a series of differentially settable type bars 18 the controlled movement of which bars is adapted to position its respective type between a firing pin 19 and platen 20 at the time a type hammer 21 is released. Engageable with each type bar is a vertical row of stops 22, the release of any one of which results in limiting the movement of the type bar to determine its respective printing position. Each row of stops is associated with a set of individually actuable permutation bars 23 each set corresponding to a card column, the selective displacement of any one or combination of said bars in a set in accordance with the perforation pattern in a card column resulting in release of one of the respective stops 22 associated therewith. Also engageable with certain groups of said type bars are totalizer wheels 24, which are actuated by the movement of the bars in item tabulating cycles of the machine, and which act to limit the movement of the bars in total cycles of the machine. The type bars are drawn down to their normal bottom position by a reciprocating restoring bar 25. As is well known in this art, the perforation pattern of a card in the sensing chamber is detected by sensing pins 26 arranged in a reciprocating sensing pin box 27, and is registered by the sensing pins in the upward displacement of a plurality of set pins 28 in the identical pattern which pattern is held throughout a cycle by locking slides 29. The movement of the set pins is transmitted to their respective permutation bars 23 through a series of interposed Bowden wires 31 supported in a removable structure generally referred to in machines of this class as a wiring unit 30.

Said wiring unit is formed by joining a pair of castings 32, 33 into a frame structure the lower and upper end of which each supports a pair of perforated plates 34 suitably spaced for housing a set of shouldered pins 35. An additional plate 36 disposed to the inner side of each of said pair of plates 34 contains threaded perforations to which are secured the nipples of the Bowden wires 31 and through which project the core of the wires to co-act with the pins 34. Although not shown in the drawing for reasons of clarity, it is understood that a full complement of upper and lower pins 34 is normally provided so that the movement of any set pin 28 will effect displacement of its corresponding permutation bar 23. It can be seen that the plan by which the lower wiring unit pins are wired to the upper wiring unit pins determines the relative position on a sheet or bill on which the data contained in a given card column will be printed.

The sequence of operation of machine components pertinent to the invention may be visualized by reference to Figs. 1 and 13 in conjunction with the description directly following. At the beginning of a machine cycle, the restoring bar 25 is at its lowermost position, the sensing pin box 27 is at its uppermost position, and the card feed mechanism is actuated, thus starting to feed a new record card into the sensing chamber. At the midpoint of the cycle, the sensing pin box reaches its lowermost position, the preceding card is feeding out of the sensing chamber, and the new card is feeding into proper position to be sensed.

Immediately thereafter, the sensing pin box 27 starts to rise. Sensing pins 26 finding perforations in the record card pass therethrough and act to raise corresponding set pins 28 which are held in raised position by locking slides 29. Elevation of the set pins causes elevation of corresponding Bowden wires 31 which in turn raise related ones of the permutation bars 23. Just prior to the end of the cycle when the sensing pin box reaches uppermost position, the locking slides are momentarily retracted to release the previous set up and to lock the set pins 28 in raised position according to the new sensed pattern so that the perforation pattern may be preserved throughout the next cycle regardless of subsequent sensing pin box descent.

Early in the next cycle, the restoring bar 25 starts to rise after a selected stop 22 in each denomination has been released as determined by selective displacement of the related permutation bars. Each active type bar 18 rises to a position determined by the respective stop 22 released, which is to say, at the position for printing the character represented by the perforation pattern in the corresponding card column. Shortly thereafter, just prior to the cycle mid-point, the type hammers 21 are released for printing the selected characters. From the foregoing, it is apparent that on tabulating cycles, a record card is fed into the sensing chamber at about the mid-point of one cycle, is sensed by the end of the cycle, and that the information sensed therefrom is printed near the midpoint of the machine cycle directly following.

In the present instance, the usual wiring unit is provided with additional mechanism through which the upper translator pins 35 may be actuated independently of the movement of the set pins 28. Said mechanism comprises the repetitive data device 11, and the consecutive data device 12, each said device being secured to the rear wiring unit casting 33.

The repetitive data device is mounted in brackets 41, 42 secured to the rear wiring unit casting 33, as best seen in Figs. 2, 9 and 10. A pair of perforated plates 43, extending between and secured to the brackets near the upper end thereof, form means for supporting one end of an additional group of Bowden wires 44. The Bowdens pass through perforations in the upper one of said plates 43 and the exposed end or core of each of said wires projects through a corresponding perforation in the lower one of said plates, which latter perforations are threaded for securing the nipple of each wire. Said threaded perforations represent index positions in the well known Powers ninety column code and are arranged in front to rear columns of six each. In the present embodiment, provision is made for thirteen columns of index positions, which is to say that the repetitive data device of the present instance can accommodate a maximum of thirteen characters of supplemental data, although the device could be provided with any number of columns of index positions, to accommodate a greater number of characters, limited only by the extent to which it is possible to widen the supporting structure of the device.

Each of a pair of supporting plates 45, spaced beneath and secured to the lower one of said perforated plates 43, provides perforations for mounting a plurality of plungers 46, each of said plungers being in direct vertical alignment with a corresponding one of said Bowden wires 46.

A cradle member 47 extending between the brackets 41, 42 and having an upstanding portion formed off at each end thereof is guided for reciprocating motion by a pair of slots 48 located in vertical alignment in each of the brackets 42. An upper roller 51 is pivotally mounted on an upper pin 52 and a lower roller 53 is pivotally mounted on a lower pin 54, said pins being fast at respective locations on each upstanding end portion of the cradle member 47. Said upper rollers and lower rollers are confined, each within a corresponding slot 48 in the brackets 42. Construction is such that motion of the cradle member is permitted only in a vertical plane.

A settable pin box comprising a mounting plate 55 and a guide plate 56 secured thereto in spaced relation for mounting a plurality of settable pins 57 is removably disposed in said cradle said plate 55 being slidably supported in slotted blocks suitably secured to the upstanding end portions of the cradle member 47. Said settable pins correspond in number and location to the plungers 46 and are in direct vertical alignment therewith. A pair of spring actuated pins 58 guided by holes in the mounting plate 55 and plate 56 serve to engage corresponding holes in the base portion of the cradle member for maintaining vertical alignment of the mounting plate with respect to the cradle member, which is to say, alignment of the settable pins 57 with their respective plungers 46.

Manual depression of a thumb piece 59 toward a bent off portion of the mounting plate 55, acts to raise the spring pressed pins 58 thus permitting withdrawal and insertion of the pin box for purposes of manual adjustment or setting of the settable pins 57.

Each of the settable pins 57 may be set to lower ineffective position as shown in Fig. 9, or may be set to an upper effective position by pushing upward on the pin until a notch 61 formed at the lower end thereof is engaged by the edge of the corresponding perforation in a spring urged lock plate 62 overlying the plate 55. All settable pins raised to effective position tend to be held in that position by the lock plate 62 under suitable spring tension. The lower portion of each pin is shaped to provide a camming edge 63 which shifts the lock plate against tension of spring to release a previous set up as a new pin is manually set in the upper effective position.

It is apparent that the settable pins 57 for each column of Bowden wires 44 when set effective form pattern representations of data in the well known Powers ninety column code. Elevation of the settable pin box, then transmits said pattern representations to their respective permutation bars 23 through the interposed Bowden wires 44. Selective displacement of any one or combination of said bars in a set, in accordance with a pattern representation in the related column, results in release of a particular one of the set of stops 22 associated therewith, thus limiting the movement of the related type bars 18 to the position for printing the character represented by said pattern representation, as described hereinbefore.

The cradle 47 containing the settable pins is elevated by a rock shaft 65 supported in the brackets 41, 42 which shaft carries a pair of rock arms 66 fast thereon. A pin 67 at the outer end of each rock arm 66 engages a vertical slot 68 near the upper end of a corresponding link 69. Each of the upper pins 52 on the cradle has an extension formed off therefrom for pivotal connection to the lower end of the respective link 69. A pair of levers 71 loose on the rock shaft 65 are maintained in horizontal alignment by a connecting torsion bar 72. A pin 73 extending from the outer end of each lever 71 engages a horizontal slot 74 in the upper end of each link 69. It will be seen that cyclical rocking of the rock shaft will impart vertical reciprocating motion to the cradle member and attached settable pin box by means of the arms 66 and links 69, and that the loose levers 71 and connecting torsion bar 72 cooperate to maintain the two ends of the cradle member in horizontal alignment despite unbalanced loading thereof. The slots 68 permit the pins 67 and arms 71 to move in idle motion whenever the cradle member 47 is held in its elevated position by means described hereinafter.

A pivot pin 76 fast in the right-hand bracket 42 (as seen in Fig. 10) supports a loose lever 77 having an ear 78 formed off at the upper end thereof for engagement at certain times with a notch 79 formed in the corresponding link 69. A loose bellcrank 81, pivotally mounted on the pivot pin 76, has an ear 82 formed off at the lower end thereof. A spring 83 serves to connect the ear 82 with a similar ear 84 located at the lower end of the lever 77. A housing 85 secured to an angle bracket 86 mounted on the right hand bracket 42 (see Figure 10) serves to anchor one end of a Bowden wire 90. The exposed end or core of the Bowden wire when extended contacts an ear 87 formed off from the upper arm of the loose bellcrank 81. A spring 88 urges the bellcrank clockwise toward a normal position. The other end of the Bowden wire 90 is directed to a selected one of the lower wiring unit pins 35 for actuation upon sensing a related control hole in the record card being sensed. When actuated the Bowden wire renders the lever effective for holding the cradle elevated throughout an operating cycle thereby effecting entry of the data set-up in the associated pin box.

A pin 91 fast on the left-hand bracket 41, as seen in Fig. 2, and a pin 92 fast on the left-hand link 69, serve to anchor respective ends of a spring 93. Action of the spring tends to urge the supporting cradle member 47 and actuating linkage toward its lowermost position.

Each of the Bowden wires 44 is adapted to actuate one of the upper translator pins 35. Preferably this result is accomplished by joining each wire 44 with a corresponding wire 31 in the well known inverted Y-wire connection commonly employed in machines of this class, and which permits actuation of upper pins 35 by either wire independently of the other. In this manner it can be seen that upward movement of the pin supporting member 47 and related parts carrying preset data representative patterns in the columns of settable pins 57 will transmit those patterns by means of the Bowden wires 44 to the related sets of permutation bars 23 thus positioning related type bars 18 as previously described. The particular wire 31 with which an additional wire 44 is joined obviously is determined according to the requirements of the user and the nature of the data set up in the settable pins 57. When the setting is used for entering a numeric item such as a service charge for inclusion in a total, the wires 44 responsive to the numeric portion of the setting would accordingly be joined with those wires 31 actuating permutation bars 23 which control adding type bars 18. When only printing of the settable data is desired, then the wiring may be determined in accordance with the relative position on the sheet in which the printing is desired. If the mode of operation of the device, as hereinafter more fully described, requires printing of the preset data on the same line as the printing of data contained in a card, it is, of course, apparent that the additional wires 44 be so connected as to actuate the permutation bars 23 corresponding to a blank field of columns in such card. In other modes of operation, however, the wiring of the additional Bowden wires 44 need not be so limited.

Actuating means for rocking the rock shaft 65 are associated in the present instance with the main base drive shaft 95 (corresponding to the main base drive shaft 112 in Patent 2,381,361). A cam 96 is secured to split collars fast on said shaft.

A lever 97 free on a pivot rod 98 fast in the left frame of the machine carries a roller 99 pivotally mounted near one end thereof. The opposite end of the lever projects through an opening in the machine frame. In the cited instance, as seen in Fig. 2, the lever 97 is formed by two members, said members being similar in side elevation but differing in that one member 97 has an offset formed off at one end. Construction is such that a link 101 and spacer 102 pivotally mounted on a pin 103 fast in the corresponding ends of the members 97 contribute mechanical rigidity to the associated parts.

The link 101 is joined to a link 104 in a manner permitting adjustment of the overall length of the combined links. In the present instance, such adjustment is achieved by placing slots in the link 101 in cooperative relation with each of two suitable bolts 105 threaded into link 104. Positive control of such adjustment is made possible by an eccentric 106 pivotally mounted on the link 104. A series of hemispherical convolutions formed into the periphery of the eccentric act to cooperate with a limit pin 107 fast in the upper end of the link 101. By loosening the bolts 105 and rotating the eccentric 106, so that each of the convolutions contacts the stop pin 107 in turn, it is possible to selectively adjust the overall length of the combined links. In this manner a positive means is obtained for transmitting the driving force from the link 101 to the link 104 while retaining ease of adjustment.

The link 104 extends in an upward direction and is guided in a bracket 108 and connects at its upper end with an interponent 111 pivoted thereon. The interponent may be held active by a plunger 112 slidable in a housing fast on said interponent, said plunger being spring pressed so that its outer end may engage a hole near the upper end of the link 104. The plunger 112 has the usual pin cooperating with a slot when it is desired for the plunger to lock or can be turned out over the top of the housing in order to hold the plunger in inactive position thus allowing the interponent 111 to be swung downward about its pivot to inactive position.

Whenever the interponent 111 is set inactive, the link 104 may be raised until a plunger 113 slidable in a housing fast on the bracket 108 may be manually extended in the usual manner to engage another hole in the link 104. In this manner, the lever 97 is held clear of the cam 96 when not in actual use, thus eliminating unnecessary movement of operating linkage.

An arm 114 fast on the rock shaft 65 has a roller 115 pivotally mounted near the outer end thereof. Upward motion of the link 104 with the interponent 111 set active obtains counterclockwise motion of the arm as viewed in Fig. 1 thus rocking the rock shaft in counterclockwise direction. Construction is such that with the plunger 113 set ineffective and the interponent 111 set active each rotation of the main base drive shaft, by action of the cam 96, will cause the lever 97 to rock in a counterclockwise direction and to return. Such motion is transmitted by means of the combined links 101 and 104 to the arm 114 and results in rocking of the rock shaft in a counterclockwise direction and return to raise and lower the settable pin box. Such action will occur, as seen in Fig. 14, from 296° of one cycle to 15° of the next machine cycle unless otherwise prevented by means described hereinbefore, the linkage being fully raised by the cam from 330°–338°.

It will be realized that in the normal course of machine operation, the set pins 28 are raised at the same time that the interponent 111 if set active and associated linkage is raised. In event the machine was halted at this point in the cycle, attempted removal of the wiring unit would result in probable damage to the set pins and related parts of the wiring unit. To obviate this result, an ear 116 formed off from the interponent 111 has a pin 117 secured thereon and arranged so that inadvertent removal of the wiring unit 30 is not possible with the linkage in raised position.

Supplemental data to be printed is entered by setting selected ones of the settable pins 57 in each column to effective position according to pattern representations in Powers ninety column code. In the particular embodiment disclosed herein, a maximum of 13 digits, or of 13 characters, may be so entered. A control hole is punched in each record card desired to control printing of the supplemental data at a location permitting actuation of the associated Bowden wire 90.

It will be remembered that the main base drive shaft 95 completes one revolution during each machine cycle, and that the cradle member 47 (as seen in Figs. 9 and 10) and the sensing pin box are at their respective lowermost positions at about the mid-point of the machine cycle.

Normal counterclockwise motion of the shaft 95 (Fig. 1) and attached cam 96 from this mid-point will cause motion of the lever 97, link 104, and arm 114 so as to rock the rock shaft 65 in counterclockwise direction starting at about 296°. Such motion causes corresponding motion of the arms 66 and links 69 so as to raise the supporting cradle member 47 and attached pin box, the sensing pin box 27 and the cradle member 47 rising in unison. Such motion of the cradle member causes all settable pins 57 in active position to raise their corresponding Bowden wires 44, which in turn raise related ones of the permutation bars 23 in each set in pattern representations of the supplemental data. As the cradle member nears its uppermost position, extension of the Bowden wire 90 by the rising sensing pin box upon sensing of a proper control hole in the record card provides counterclockwise movement of the bell crank 81 (see Fig. 10). Such movement of the bell crank rocks the lever 77 by means of the spring 83 so that as the cradle member starts to descend beginning at 338° the ear 78 engages the notch 79. In this manner the supporting member 47 is latched in uppermost position, or substantially so, and continued motion of the shaft 65 moves the arms 66 downward in idle motion permitted by the slots 68.

In this manner all active plungers 46 are locked in elevated position throughout the ensuing cycle so that a selected stop 22 in each denomination as determined by selective displacement of the related permutation bars may be released for arresting the related type bar at the position for printing the desired character of supplemental data near the middle of the following cycle. The sensing pin box 27 returns to its lowermost position at about the mid-point of said machine cycle next following at which time a new card is feeding into the card sensing chamber and the action repeats as described in the foregoing.

It will be realized that counterclockwise motion of the rock shaft 65 in the latter part of this next machine cycle will raise the arms 66 to their highest position whereupon tension of the notch 79 against the ear 78 will be relieved. The ear, at this time, is still in effective latching position since the Bowden 90 is held actuated until the locking slide retract mechanism is operated at about 345°. If the card sensed on this second machine cycle has a proper control hole for printing the supplementary data, the Bowden will not be released when the retract mechanism is operated and the bellcrank 81 will maintain the lever 77 in position to engage the notch 79 as described previously The cradle member 47 will therefore remain in raised position, thereby causing the supplementary data to again be printed near the midpoint of the machine cycle next following. Failure to sense a proper control hole in the second cycle will allow the lever 77 to be urged clockwise (as seen in Fig. 19) by action of the spring 88 when the retract mechanism is operated to thereby disengage said lever from the notch 79 as the cradle starts to descend. The supporting cradle member 47 then returns to its lowermost position with consequent non-printing of the supplementary data on the machine cycle next following.

From the foregoing, it is apparent that printing of the supplementary data is obtained upon sensing of a proper control hole in a controlling card. Normal operation of the mechanism as described above will result in printing the data set up in the settable pins 57 on the same line as the data recorded in said controlling card.

The consecutive data device, 12, is mounted in brackets 121, 122 secured to the rear translator casting 33, best seen in Figs. 2 and 3–8. A perforated plate 123, extending between and secured to the brackets near the upper end thereof, serves to support one end of an additional group of Bowden wires 125. The exposed end of each of said wires projects through a corresponding perforation in a plate 124, which perforations are threaded for securing the nipple of each wire. Said threaded perforations represent index positions in the well known Powers ninety column code and are arranged in front to rear columns of six each. In the present embodiment, provision is made for six columns of index positions, which is to say that the consecutive data device of the present instance can accommodate a maximum of six characters of supplemental data, although the device could be provided with any number of columns of index positions to accommodate a geater number of characters, limited only by the extent to which it is possible to widen the supporting structure of the device.

Each of a pair of supporting plates 126, spaced beneath and secured to the perforated plate 124, provides perforations for mounting a plurality of shouldered pins 127, each of said pins being in direct vertical alignment with a corresponding one of said Bowden wires 125. A well in the upper end of each pin 127 is adapted for receiving the exposed end of its related Bowden wire 125.

Each of wires 125 is adapted to actuate one of the upper spring urged translator pins 35. Preferably this result is accomplished by joining each wire 125 with a corresponding wire 31 in the well known inverted Y-wire connection commonly employed in machine of this class and which permits actuation of upper pins 35 by either wire independently of the other. In this manner it can be seen that upward movement of selected ones of a column of the pins 127 in a data representative pattern will transmit that patter nthrough the Bowden wires 125 to the permutation bars 23 to result in positioning of a related type bar 18 as previously described. The particular wire 31 with which an additional wire 125 is joined obviously is determined according to the requirements of the user, as described hereinbefore.

Adjacent to each row of pins 127, a locking slide 128 is mounted, guided by a plurality of spacers 129. Each of the pins 127 has a small stud 131 lying in a related aperture 132 in the slide 128, said aperture being formed with a locking shoulder 133, these slides being made in the form of grids as shown. The construction is such that whenever one of the pins 127 is pushed to its upper position, movement of the related locking slide to the left as seen in Fig. 7, will automatically latch the pin in its raised position. All pins in a column can be released from the latch position by pushing the related slide 128 to the right.

It will be understood that the locking slides are guided against up and down motion by the pin supporting plates described and that they are guided against motion right and left of the machine by the rows of pins and spacers between which they are situated.

A shaft 135 extending between and pivotally mounted in the brackets 121, 122 supports at each end thereof a rock arm 136 attached to a collar 137 fast on said shaft. Directly adjacent to each arm 136 is a bell crank lever 138 free to turn on said shaft. A bail bar 140 carry rollers 139 at each end thereof and extending between and fast on the bell crank levers 138 engages a notch in each locking slide 128. A pin fast in each arm 136 is arranged in co-operative relationship with a slot in the related lever 138. The levers 138 are maintained in horizontal alignment by a connecting bar 142, extending between and fast near the upper ends of said levers. It will be seen that said connecting bar, tends to maintain horizontal alignment of the bail bar 140 despite unbalanced loading thereof.

A spring 143 extending from each end of the connecting bar 142 to a respective one of the arms 136 causes the bail bar 140 and associated latch slides 128 to yieldably follow the movement of arm 136 to certain times as described hereinafter.

The shaft 135 is rocked to locking position in selected cycles by a control lever 145 fast at one end thereof and having an ear 146 formed off at the upper edge thereof and an ear 147 formed off at the lower edge thereof. A housing 148 secured to an angle bracket 149 mounted near the right-hand brackets 122 as seen in Fig. 6, serves to anchor one end of a Bowden wire 150. The exposed end of the Bowden wire, when extended, contacts the ear 146 of the control lever 145. A spring 151 stretched between ear 147 and bracket 149 urges the control lever toward a non-locking position against the end of the Bowden wire. The other end of the Bowden wire 150 is directed to a selected one of the lower wiring unit pins 35 for actuation upon sensing of a related control hole in the record card being sensed.

The pins 127 are selectively actuated each cycle by data representative means mounted in a cradle member 152 extending between the brackets 121, 122 and having an upstanding portion formed off at each end thereof, said cradle member being guided for reciprocating motion by slots 153 located in vertical alignment in each of said brackets. As best seen in Figs. 4 and 5, an upper roller 154 and a lower roller 155 are pivotally mounted at respective locations on each upstanding portion of the cradle member 152. Said upper rollers and said lower rollers are confined, each within a corresponding slot 153 in the brackets 121, 122. Construction is such that motion of the cradle member is permitted only in a vertical plane.

The cradle is cyclically raised by the rock shaft 65 which carries a pair of rock arms 156 fast thereon. A pin 157 at the outer end of each rock arm 156 is pivotally joined to the upper end of one of a pair of links 158. Each lower roller 155 on the cradle is carried by a pin operatively associated with a corresponding slot 161 near the lower end of the links 158. It will be seen that cyclical rocking of the rock shaft 65 will impart vertical reciprocating motion to the cradle member 152 by means of the arms 156 and the links 158. Starting at a point whereat said rock shaft is at its furthest point of travel in a counterclockwise direction, as seen in Fig. 4, the cradle member will be at its lowermost position and each of the pins carrying the lower rollers 155 will be at the upper end of their respective slots 161. During the early portion of clockwise movement of said rock shaft, starting at 296° the links 158 will move upward in idle motion, with said cradle member remaining at its lowermost position. Sensing of a proper control hole in the record card previously sensed will result in stepping of the consecutive data mechanism from the existing set-up to the succeeding set-up during this interval by means described hereinafter.

At a certain point in clockwise movement of the rock shaft, i. e., about 311°, the lower ends of the slots 161 will engage said pins and continued shaft movement will elevate the cradle member 152. The exact point in movement of the rock shaft at which the links 158 pick up the cradle 152 is determined by mechanism as follows. A vertical slot formed in each upstanding portion of the cradle member 152 permits adjustment in position of said pins in a vertical plane. A cam plate 162 having an eccentric cam slot 163 formed therein is pivotally mounted at a suitable location on each upstanding portion of said cradle member. Each of said lower pins is detachably mounted for purposes of adjustment. Construction is such that each pin passes through its respective slot in cradle member 152 and cam slot 163. By loosening each said pin slightly, pin position may be varied by movement of the related cam plate 162. Upon attainment of a proper adjustment, the parts are again secured in position.

Suitably secured to the cradle 152 is a drum supporting framework consisting of an angle plate 165, blocks 166 secured thereto, and an upright plate 167 bolted to said blocks. The upturned portions of the angle plate 165 and plate 167 carry a plurality of perforated drums 170 suitably journaled therein, and the axes of which are disposed in vertical alignment with corresponding columns of the pins 127 as best seen in the flat layouts thereof in Figs. 17 and 18. The surface of each drum is provided with columns of perforations extending axially thereof and of a sufficient diameter to accommodate a related pin 127 when the cradle is raised. Said perforations constitute index positions in the well known Powers ninety column code, each column thereof, other than that representing zero having one or more index positions unperforated, which unperforated index positions represent in said code the supplemental data to be entered. Rotation of each drum to various settings by means hereinafter described, positions corresponding columns of index positions directly beneath the associated column of pins 127 whereby, upon elevation of the cradle, the unperforated positions of the selected column will actuate the desired pins to a position enabling engagement thereof by the associated locking slides 128 to thereby enter the data so represented.

By reference to Fig. 15 it will be seen that the pins 127 are engaged by the drums 170 at about 313° and are held in fully raised position until about 338° of the cycle. If the card then in the card sensing chamber contains the proper control hole for actuation of the Bowden wire 150, said wire will be fully actuated by about 335° of the cycle, to render the locking slides effective for holding the pins actuated in raised position prior to the time the cradle starts to descend at about 338°. Since the Bowden wire 150 is subsequently locked in actuated position by the retract mechanism associated with the card sensing pin box, the locking slides 128 will be effective for holding the pins 127 in raised position throughout most of the following cycle, thereby enabling entry of the data so represented which data is printed at about the mid-point of said following cycle. In the event the card being simultaneously sensed in the sensing chamber contains no control hole for actuation of the Bowden wire 150, the locking slides 128 will be ineffective and the pins 127 engaged by the drums 170 will drop with the drums at about 338°, thereby preventing entry of the data represented by the setting of said drums. Accordingly it will be seen that in this manner, the entry or non-entry of consecutive supplemental data, along with data sensed from a record card, is determined by the presence or absence of a control hole in the same record card.

In order to positively retract the locking slides 128 in preparation for each new entry, retract means are provided which include a retract pawl 171 pivotally mounted on each of the cradle lift links 158, each pawl being yieldably urged against a limit stud 172 by a spring 173. Each of said pawls is formed with an inclined camming edge so disposed as to engage the rollers 139 on bail rod 140 as the links are raised in each cycle, thereby rocking said bail rod clockwise as viewed in Fig. 4 to retract all locking slides to an inoperative position, releasing the pins 127 from the previous set-up. This retract rocking movement of the bail rod 140 occurs at about 310° of the cycle, and, when occurring in cycles when the Bowden wire 150 is actuated, is permitted by reason of the yieldable pin and slot connection between the arms 136 and levers 138. On the downward movement of the links 158 and cradle member 152 in cycles when the Bowden wire 150 is actuated, said pawl merely bumps idly over the bail rod 140 against the tension of the spring 173. In this manner it will be seen that said positive acting retract mechanism just described is effective for releasing the set-up in the pins 127 just prior to the establishment of the new set-up therein in accordance with a different setting of the drums 170.

A shaft 175, formed off one end of each of the drums 170 as best seen in Figs. 7, 8 serves to support various co-operating devices for setting the drums as described directly following. In the particular embodiment disclosed herein, the consecutive supplemental data is numerical in nature although alphabetical data or other desired characters, or any combination thereof, may be substituted in place of the numerical data, if desired.

Accordingly, the drum at the right end of the row of drums, as seen in Fig. 3, hereinafter referred to as the units drum provides data for the units column of the supplemental data, and disposed toward the left, successive drums provide data for successively higher orders of the supplemental data.

Toothed detent wheels 176, one fast on the shaft 175 of each of the drums and arranged in staggered relation permits stopping of the drums at specified intervals in rotation thereof. To this end, detent lever 177 operatively associated with each said wheel is pivotally mounted in one of the blocks 166 and has an arm formed off therefrom of suitable shape for engaging between the teeth of said detent wheel. Another arm formed off from each lever 177 extends downward, oppositely disposed pairs of arms being connected by a spring 178. In the present instance, each detent wheel 176 is provided with ten indentations, each indentation corresponding to a digit from zero through nine, and numbered accordingly on the outer surface thereof. Construction is such that each lever 177 co-operates with its respective wheel 176 in such manner as to index said wheel, which is to say, to position its related drum, in any one of ten set positions thereof.

For stepping the drums through a succession of settings a ratchet wheel 180 is fast on the shaft of the units drum and a gear wheel 181 is fast on the shaft of each of the drums of higher order. A carry tooth 182 is formed off from the ratchet wheel 180 and from each gear wheel 181. Construction is such that the carry tooth 182 of a drum of lower order co-operates with the gear wheel 181 of the drum of next higher order, so that said gear wheel of next higher order is moved from one indexed position to the next indexed position in ascending order whenever the gear wheel of a lower order moves from its nine position to its zero position, in the familiar manner of a carry mechanism. The gear wheel associated with the drum of highest order (at extreme left, as seen in Fig. 3) does not have a carry tooth.

It will be seen that each of the drums 170 may be indexed so that a desired numeric pattern is positioned in vertical alignment with the related column of settable pins. Elevation of the cradle assembly 152 will cause certain of the settable pins 127 in each column (corresponding to unperforated drum locations) to be raised, while others of the settable pins in the same column corresponding to perforations in the drum surface pass therethrough. In this manner, certain of the pins are raised in each column of the consecutive data device according to pattern representations of the Powers ninety column code as determined by the stepped positions of the respective drums 170.

Mounted on an auxiliary portion 183 formed off from the bracket 122 as seen in Fig. 3 is a stub shaft 185. An arm 186 fast on said stub shaft is pivotally attached to the lower end of a twisted link 187 whose upper end is pivotally attached to an extension of the right-hand one of the cradle lifting pins 157. Also fast on said stub shaft is a cam 190 operatively associated with a roller 191 pivotally mounted on a lever 192. A pin 193 mounted near the lower edge of said bracket portion 183 serves to support the lower end of the lever in pivotal fashion. A ratchet pawl 194 pivotally mounted near the upper end of said lever is arranged in co-operative relationship with the ratchet wheel 180 fast on the shaft of the units drum, said ratchet wheel being adapted for operation thereby.

Upward motion of the link 187 from its lowermost position shown in Fig. 3 is transferred through the stub shaft 185 with resulting leftward motion of the lever 192 due to the action of the cam 190. In this manner, movement of the ratchet wheel 180 is obtained from its existing set position to the next set position in counterclockwise rotation thereof. Downward motion of the link 187 then returns the associated members to the initial position shown in Fig. 3. An arm formed off at the lower end of the lever 192 serves for attachment of one end of a spring 195. Opposite end of said spring is attached to a pin fast in the bracket portion 183. Spring action tends to urge the lever 192 toward said initial position.

A control lever 196 free to turn on the pivot pin 193 has a pawl enabling shoulder 197 and a pawl disabling shoulder 198 formed at the upper portion thereof. An ear 199 formed off from the ratchet pawl 194 acts in co-operative relationship with the shoulders of the lever 196 according to the desired mode of operation as described hereinafter.

A housing 201 secured to an angle bracket fast on the lower corner of the bracket portion 183 serves to anchor one end of a Bowden wire 200. The exposed end or core of the Bowden wire 200 when extended contacts an ear 202 formed off from the lower end of the control lever 196. Springs 203 and 204, one end of each of said springs being attached to a respective pin on the lever 196, and the opposite ends of both springs being attached to a pin 205 on the ratchet pawl 194, combine to urge the control lever 196 counterclockwise as seen in Fig. 3 to follow the movement of the pawl and to urge the tooth formed off the outer end of said ratchet pawl downward into operative relationship with the teeth of the ratchet wheel 180. The other end of the Bowden wire 200 is directed to a selected one of the lower wiring unit pins 35 for actuation upon sensing of a related control hole in the record card being sensed.

The ear 199 of the ratchet pawl 194 upon non-actuation of Bowden wire 200 rests on the disabling shoulder 198 of the lever 196 when the link 187 is at its lowermost or initial position (see Fig. 12). With the ear in this position, the tooth of the ratchet pawl will be raised sufficiently to clear the ratchet wheel 180 throughout travel of said ratchet pawl obtained during elevation and depression of the link 187. In this manner, said ratchet pawl will move in idle motion during those strokes thereof wherein a control hole for actuation of the Bowden wire 200 is absent. That is to say, the consecutive data device will not be stepped to the succeeding setting during such strokes.

Sensing of a proper control hole to extend the Bowden wire 200 will cause the lever 196 to rotate in clockwise direction. The ear 199 will drop to the enabling shoulder 197 (see Fig. 3) thus permitting the tooth of the ratchet pawl to engage the ratchet wheel 180 during leftward advance movement of said ratchet pawl. Construction is such that the ratchet wheel will be caused to move a distance equal to the space from one tooth to the next of said ratchet wheel, which is to say, from the indexed setting of the units drum 170 then in existence to the next succeeding indexed setting of said drum, during leftward movement of the ratchet pawl.

Figs. 2, 11, and 12 illustrate various positions of the drum stepping mechanism resulting from nonactuation of the control Bowden wire 200, Fig. 2 showing the parts at about 338° at which time the wire 200 would be actuated if a control hole were sensed, Fig. 11 showing the position at 355° with the cradle 152 lowered but before the pawl 194 is returned, and Fig. 12 showing the pawl in its disabled position reached about 15° of the next cycle. If a control hole had been sensed, the pawl would be enabled with the parts in the position shown in Fig. 3, at 15° of the cycle. It should be understood that the operative or inoperative relation of the pawl 194 to lever 196 at the time the pawl is advanced leftward, is determined by the presence or absence of the proper control hole in the record card sensed in the preceding sensing operation. By reference to Fig. 15 it will be seen that the pawl 194 is advanced by cam 190 from about 296° to 308° which is just prior to the time that the cradle 152 is picked up by the slotted links 158 at about 311° of the cycle. At the same time that the pawl is being advanced leftward, the sensing pin box is rising to sense the card then in the card sensing chamber. However, at this stage of the sensing operation the card sensing pin box is not sufficiently raised to effect the actuation of Bowden wire 200 so that if the proper control hole is sensed in such card the resulting actuation of Bowden wire 200 would not occur in time to render the pawl 194 operative in the same cycle. When the cradle member 152 starts to rise at about 311° of the cycle, the ratchet wheel 180, bearing on the bottom edge of the pawl 194 which is then in fully advanced position, rocks the pawl clockwise about its pivotal connection with the lever 192. Sensing of the card in the card sensing chamber is substantially completed at 335° of the cycle at which time the retract mechanism associated with the sensing pin box is operated. It will be understood that said retract mechanism operates to release the Bowden wire 200 at this time if said Bowden wire was actuated as the result of sensing of a proper control hole in the preceding cycle, and, if said Bowden wire is actuated as a result of sensing of a control hole in the current cycle, said retract mechanism is effected for holding said Bowden wire actuated until about 335° of the following cycle. As the cradle is lowered starting at about 338° of the cycle, the pawl 194 will drop to where the ear engages either the enabling shoulder 197 or disabling shoulder 198 of the control lever depending on whether the Bowden wire 200 is actuated as a result of the sensing of a control hole in the current cycle. The pawl will maintain its engagement with the respective one or other shoulder 197, 198 during the return stroke thereof starting at about 355° and throughout the next advance stroke thereof starting at about 296° of the following cycle wherein the operation just described is again repeated. In this manner it will be seen that the setting of the pawl 194 to either operative or inoperative relation to the lever 192 for any one stroke thereof is determined by the presence or absence of the proper control hole in a card sensed in the preceding sensing operation, and is unaffected by the presence or absence of a control hole in a card sensed in the current sensing operation.

Supplemental data to be printed in sequence, such sequence being capable of interruption at any desired point, is entered by setting selected ones of the drums 170 to a desired position for each column. In the particular embodiment disclosed herein, a maximum of six digits of numerical data may be so entered. A control hole is punched in each record card desired to control printing of the supplemental data at a location permitting actuation of the associated Bowden wire 150. In addition, a control hole is punched in each record card desired to control stepping of the consecutive data mechanism from the numerical setup to be entered with said control record to the next higher value setup in numerical sequence.

The main drive shaft 95 completes one revolution during each machine cycle, and the cradle member 152 and the sensing pin box 27 are at their respective lowermost positions at about the mid-point of the machine cycle. At this time, the ratchet pawl 194 is at its furthest rightward position as seen in Fig. 3, and the control lever 196 is at its furthest point in clockwise direction. The ear 199 rests on one or the other shoulder of the lever 196 depending on the presence of a control hole in the card previously sensed. The shaft 135 is held in its unactuated position by action of the spring 151, thus holding all of the lock slides 128 in retracted or unlocked position.

Normal counterclockwise motion of the main shaft 95 (see Fig. 1) and attached cam 96 will cause motion of the lever 97, link 104, and arm 114 so as to rock the rockshaft 65 in counterclockwise direction starting at 296°. Such motion provides rocking motion of the arms 156 and elevation of the links 158. During the early portion of such motion until 311°, the links 158 move in idle motion relative to the cradle member 152, and the cradle assembly and attached mechanism remains at its lowermost position.

Simultaneous elevation of the twisted link 187 during the early portion of rock shaft motion, through motion of the cam 190 and lever 192, causes the ratchet pawl 194 to advance leftward. If the Bowden wire 200 has been extended upon sensing of a proper control hole in the record card previously sensed the ear 199 of the pawl will have dropped down to the shoulder 197 of the lever, thus allowing the ratchet pawl to engage the ratchet wheel 180 fast on the shaft of the units drum. In this manner, the unit drum is caused to step from the setting then in effect to the setting of next higher in sequence, which stepping is effected by 308° of the cycle. Whenever the units drum moves from its nine position to zero position, the related carry tooth 182 co-operates with the gear wheel 181 of the drum of next higher order so as to step said drum of next higher order from the numeric setting then in effect to the setting of next higher in sequence, and so on for the remaining drums of higher order.

Also during this early portion of rock shaft motion, at about 310° the retract pawl 171 rocks the bail rod 140 thus causing all locking slides 128 to retract and release the pins 127 from their previous set-up.

At a certain point in the movement of the rock shaft 65, at about 313° the lower ends of the slots 161 will engage the lower pins on the cradle member 152. Continued shaft movement will elevate the cradle member and drums 170 mounted thereon. In this manner, certain of the settable pins 127 are raised in each column according to pattern representations of the Powers ninety column code as determined by the indexed positions of the respective drums 170. The cradle member is fully raised by about 330° and is held thus until about 338° of the machine cycle. In the event a control hole is present in the card being simultaneously sensed, the Bowden wire 150 will be fully actuated by 335° so as to render the locking slides effective. Such motion of the cradle member causes all settable pins 127 in active position to raise their corresponding Bowden wires 125, which in turn raise related ones of the permutation bars 23 in each set in pattern representations of the consecutive supplemental data. In this manner, all active settable pins are locked in elevated position by the locking slides 128, as described hereinbefore, until a selected stop 22 in each denomination as determined by selective displacement of the related permutation bars is released for arresting the related type bar at the position for printing the desired character of consecutive supplemental data.

The rock shaft 65 moves in the opposite direction starting at about 338° thus causing the cradle member to return to its lowermost position. During this portion of the cycle, the ear 199 of the ratchet pawl 194 is caused to engage one or the other shoulder of the lever 196 depending upon whether BW 200 is actuated under control of the card in the sensing chamber. Type hammers 21 are released just prior to the cycle mid-point for printing the characters selected by all active type bars. The sensing pin box 27 returns to its lowermost position at about the mid-point of said machine cycle next following, at which time a new card is feeding into the card chamber and the action repeats as described in the foregoing.

Failure to sense a proper control hole for extension of the Bowden wire 200 will permit the ear 199 of pawl 194 to engage the shoulder 198 of the lever 196 thus causing said ratchet pawl to advance in idle motion during the machine cycle next following. Failure to sense a proper control hole for extension of the Bowden wire 150 will result in holding all locking slides 128 in retracted position, thus preventing entry or printing of the supplemental data on the machine cycle next following.

From the foregoing, it is apparent that stepping of the consecutive data mechanism and/or entry of the consecutive supplementary data is obtained upon sensing of a respective proper control hole in a card. It is apparent that each setting of consecutive supplementary data may be entered on successive machine cycles, i. e., the sequence thereof may be interrupted at any desired point and the supplemental data then set-up may be entered for any desired number of cycles, or the sequence of data may be maintained by successive stepping of the mechanism with non-entry of each data for any desired number of cycles.

Normal operation of either the repetitive or consecutive data mechanism as described in the foregoing will result in printing of the data set up in the settable pins 57 or drums 170 on the same line as the data in the card controlling the entry or printing thereof. Should the mode of operation require the printing of such data on a separate line, that result could be obtained merely by inserting a space card, having proper control holes, at the desired location in the group of cards.

While I have described what I consider to be a highly desirable embodiment of my invention, it is obvious that many changes in form could be made without departing from the spirit of my invention, and I, therefore, do not limit myself to the exact form herein shown and described, nor to anything less than the whole of my invention as hereinbefore set forth, and as hereinafter claimed.

What I claim as new, and desire to secure by Letters Patent, is:

1. In a machine of the class described, means for feeding and sensing records, data recording means, means cyclically operable for entering in said recording means the data sensed in each record, means settable to represent data supplemental to the data sensed in a record, means for stepping said settable means to represent in succession differing items of data in accordance with a predetermined sequence, means cyclically operable for entering the data represented by said settable means in said recording means, means controlled by said sensing means upon detecting a control designation in a record being sensed for rendering said stepping means effective, and means controlled by said sensing means upon sensing a different control perforation in the record being sensed for rendering said supplemental data entering means effective concomitantly with the entry of data from said record being sensed.

2. In a machine of the class described having a plurality of members differentially settable in data recording positions, stops for said members, record card feeding and sensing means, and means operable when maintained effective for selectively releasing said stops in accordance with data sensed by said sensing means, a plurality of elements settable to represent supplemental data to be entered, operating means for reciprocating said elements concomitantly with said sensing means from ineffective to effective data entering position, transmitting means responsive to movement of said elements to effective data entering position for setting up said stop releasing means in accordance with data representations of said elements, latching means for maintaining said transmitting means effective to permit selective release of said stops, and means controlled by said sensing meanse for rendering said latching means effective.

3. In a machine of the class described having a plurality of members differentially settable in data recording positions, stops releasable for determining the setting of said members, record card feeding and sensing means, and means operable when maintained effective for selectively releasing said stops in accordance with data sensed by said sensing means, a plurality of elements settable to represent supplemental data to be entered, operating means for reciprocating said elements concomitantly with said sensing means from ineffective to effective data entering position, transmitting means actuable by movement of said elements to effective data entering position for setting up said stop releasing means in accordance with data represensations of said elements, latching means associated with said operating means for retaining said transmitting means actuated in effective data entering position to permit selective release of said stops, and means controlled by said sensing means for rendering said latching means effective.

4. In a machine of the class described having a plurality of members differentially settable in data recording positions, stops for said members, record card feeding and sensing means, and set-up means actuable in accordance with data representative patterns entered therein from said sensing means for selectively releasing said stops, a device settable to represent additional data to be entered, said device being settable successively to one of a plurality of data representative settings, said successive settings representing a corresponding succession of data according to a predetermined sequential order, means associated with said device and operable for entering in said set-up means the data represented by said device, means controlled by said sensing means upon sensing a predetermined control designation for rendering said data entering means effective concurrently with the entry of data sensed from the record having said control designation, and means controlled by said sensing means upon sensing a different predetermined control designation for stepping said device to the next successive setting prior to the next operation of said data entering means.

5. In a machine of the class described having a plurality of members differentially settable in data recording positions, stops for determining the setting of said members, record card feeding and sensing means, and means for selectively releasing said stops in accordance with data sensed by said sensing means, reciprocable set-up means including a setting member adapted to support a plurality of data denoting elements manually settable within said member in positions for denoting a constant item of data, operating means for reciprocating said elements from a normal to effective data entering position concomitantly with the operation of said sensing means, latching means for retaining said elements in data entering position, means interposed between said elements and said stops and responsive to the latching of said elements for selectively releasing said stops in accordance with the data denoted by said elements, and means controlled by said sensing means for enabling said latching means.

6. In a machine of the class described having a plurality of members differentially settable in data recording positions, stops for said members, record card feeding and sensing means, and means for selectively releasing said stops in accordance with data sensed by said sensing means, reciprocable means supporting a plurality of elements manually settable in a data-representative pattern, operating means for cyclically actuating said reciprocable means concomitantly with said sensing means from normal ineffective to effective data entering position, means for latching said reciprocble means in data entering position, means actuable by said sensing means for rendering said latching means effective, and means responsive to the latching of said reciprocable means for releasing said stops in accordance with data represented by said manually settable elements.

7. In a machine of the class described having a plurality of members differentially settable in data recording positions, stops for each of said members, record card sensing means, and means for selectively releasing said stops in accordance with data sensed by said sensing means, set-up means including a setting member and a plurality of elements manually settable in said member in positions for denoting a constant item of data, operating means for reciprocating said elements concomitantly with the operation of said sensing means, latching means operable under control of said sensing means for retaining said elements in data entering position independently of said operating means, and means interposed between said elements and said stops and responsive to the latching of said elements for selectively releasing said stops in accordance with the data denoted by said elements.

8. In a card controlled machine of the class described, a plurality of differential members, selesctively releasable stops for each of said members, reciprocable sensing means for detecting a data-representative pattern of a record card, reciprocable means comprising a setting member and a plurality of elements manually settable therein to denote a data-representative pattern, operating means for reciprocating said elements concomitantly with the operation of said sensing means, latching means operable under control of said sensing means for retaining said elements in data entering position independently of said operating means, means interposed between said stops and said sensing means for releasing said stops in accordance with the pattern detected by said sensing means, and means interposed between said stops and said manually settable elements and responsive to the latching of said elements for releasing said stops in accordance with the pattern denoted by said elements.

9. In a card controlled machine of the class described, a plurality of differential data recording members, means for sensing a record card, means for controlling certain of said members in accordance with a data-representative pattern detected by said sensing means, a reciprocable member adapted to contain a plurality of elements manually settable in data-representative patterns, operating means for reciprocating said member to and from data entering position concomitantly with the operation of said sensing means, latching means controlled by said sensing means for retaining said reciprocable member in data entering position independently of said operating means, means responsive of latching of said reciprocable member in data entering position for controlling others of said differential members in accordance with the data-representative pattern set in said reciprocable member, and means controlled by said sensing means upon sensing a special representation on a card for rendering said latching means effective.

10. In a machine of the class described having a plurality of members differentially settable in data recording positions, stops releasable for determining the setting of said members, record card feeding and sensing means, means for selectively releasing said stops in accordance with data sensed by said sensing means, a data representative device settable successively to one of a plurality of data representative settings, said device in said successive settings representing a corresponding succession of data according to a predetermined sequential order, operating means for reciprocating said data device concomitantly with said sensing means from ineffective to effective data entering position, transmitting means actuable by movement of said data device to effective data entering position for setting up said stop releasing means in accordance with said successive settings, latching means associated with said transmitting means for retaining said transmitting means in effective data entering position to permit selective release of said stops, and means controlled by said sensing means for rendering said latching means effective.

11. In a machine of the class described having a plurality of members differentially settable in data recording positions, stops releasable for determining the setting of said members, record card feeding and sensing means, means for selectively releasing said stops in accordance with data sensed by said sensing means, a data representative device settable successively to one of a plurality of data representative settings, said device in said successive settings representing a corresponding succession of data according to a predetermined sequential order, means controlled by said sensing means for stepping said data device from one setting to the next data setting thereof, operating means for reciprocating said data device concomitantly with said sensing means from ineffective to effective data entering position, transmitting means actuable by movement of said data device to effective data entering position for setting up said stop releasing means in accordance with said successive settings, latching means associated with said transmitting means for retaining said transmitting means actuated in effective data entering position to permit selective release of said stops, and means controlled by said sensing means for rendering said latching means effective.

12. In a machine of the class described having a plurality of members differentially settable in data recording positions, stops releasable for determining the setting of said members, record card feeding and sensing means, means for selectively releasing said stops in accordance with data sensed by said sensing means, a plurality of data representative devices, including one for each order of the data to be entered, each of said data devices being settable successively to one of a plurality of data representative settings, said successive settings representing a corresponding succession of data according to a predetermined sequential order, operating means for reciprocating said data devices from ineffective to effective data entering position, transmitting means actuable by movement of said data devices to effective data entering position for setting up said stop releasing means in accordance with data representations of said data devices, latching means associated with said transmitting means for retaining said transmitting means actuated in effective data entering position to permit selective release of said stops, and means controlled by said sensing means for rendering said latching means effective.

13. In a machine of the class described having a plurality of members differentially settable in data recording positions, stops releasable for determining the setting of said members, record card feeding and sensing means, means for selectively releasing said stops in accordance with data sensed by said sensing means, a plurality of data representative devices, including one for each order of the data to be entered, each of said data devices being settable successively to one of a plurality of data representative settings, said successive settings representing a corresponding succession of data according to a predetermined sequential order, carry means responsive to completion of a predetermined number of data representative settings of the device of lower order for stepping the device of higher order to the next data setting thereof, operating means for reciprocating said data devices from ineffective to effective data entering position, transmitting means actuable by movement of said data devices to effective data entering position for setting up said stop releasing means in accordance with the data representations of said data devices, latching means associated with said transmitting means for retaining said transmitting means actuated in effective data entering position to permit selective release of said stops, means controlled by said sensing means for stepping the device of lowest order from one data setting to the next, and means controlled by said sensing means for rendering said latching means effective.

14. In a machine of the class described having a plurality of members differentially settable in data recording positions, stops releasable for determining the setting of said members, record card feeding and sensing means, means for selectively releasing said stops in accordance with data sensed by said sensing means, a plurality of data representative devices, including one for each order of the data to be entered, each of said data devices being settable successively to one of a plurality of data representative settings, said successive settings representing a corresponding succession of data according to a predetermined sequential order, carry means responsive to completion of a predetermined number of data representative settings of the device of lower order for stepping the device of higher order to the next data setting thereof, operating means for reciprocating said data devices from ineffective to effective data entering position concomitantly with the operation of said sensing means, a plurality of plungers actuable by movement of said data devices to effective data entering position for setting up said stop releasing means in accordance with the data representative setting of said data devices, latching means associated with said plungers for retaining said plungers actuated in effective data entering position to permit selective release of said stops, means controlled by said sensing means for stepping the device of lowest order from one data setting to the next, and means controlled by said sensing means for rendering said latching means effective.

15. In a card controlled machine of the class described, a plurality of differential data recording members, means for sensing a record card, means for controlling certain of said members in accordance with a data-representative pattern detected by said sensing means, a plurality of drums, including one for each order of data to be entered, each of said drums having a plurality of data representative patterns contained therein and being settable successively to render one of said data patterns effective, said successive settings representing a corresponding succession of data according to a predetermined sequential order, carry means responsive to completion of a predetermined number of data representative settings of the drum of lower order for stepping the drum of higher order to the next data setting thereof, operating means for reciprocating said drums from ineffective to effective data entering position concomitantly with the operation of said sensing means, a plurality of plungers actuable by movement of said drums to effective data entering position for transmitting the data representations set up by said drums, latching means controlled by said sensing means for retaining said plungers in actuated position independently of said operating means, means responsive to latching of said plungers in actuated position for controlling others of said differential members in accordance with the data representative pattern set in said drums, means controlled by said sensing means upon sensing a special representation on a card for stepping the device of lowest order from one data setting to the next, and means controlled by said sensing means upon sensing a special representation on a card for rendering said latching means effective.

16. In a machine of the class described having a plurality of members differentially settable in data recording positions, stops releasable for determining the setting of said members, record card feeding and sensing means, means for selectively releasing said stops in accordance with data sensed by said sensing means, a plurality of supplemental data representative devices, including one for each order of the supplemental data to be entered, each of said data devices being settable successively to one of a plurality of data representative settings, said successive settings representing a corresponding succession of data according to a predetermined sequential order, operating means for reciprocating said data devices from ineffective to effective data entering position, transmitting means actuable by movement of said data devices to effective data entering position for setting up said stop releasing means in accordance with the data representations of said data devices, latching means associated with said transmitting means for retaining said transmitting means actuated in effective data entering position to permit selective release of said stops, and means controlled by said sensing means for rendering said latching means effective.

17. In a machine of the class described having a plurality of members differentially settable in data recording positions, stops releasable for determining the setting of said members, record card feeding and sensing means, means for selectively releasing said stops in accordance with data sensed by said sensing means, a plurality of data representative devices, including one for each order of the data to be entered, each of said data devices being settable successively to one of a plurality of data representative settings, said successive settings representing a corresponding succession of data according to a predetermined sequential order, carry means responsive to completion of a predetermined number of data representative settings of the device of lower order for stepping the device of higher order to the next data setting thereof, operating means for reciprocating said data devices from ineffective to effective data entering position, transmitting means actuable by movement of said data devices to effective data entering position for setting up said stop releasing means in accordance with the data representations of said data devices, and means controlled by said sensing means for stepping the device of lowest order from one data setting to the next.

References Cited in the file of this patent
UNITED STATES PATENTS

| | | |
|---|---|---|
| 2,090,103 | Bryce | Aug. 17, 1937 |
| 2,516,014 | Mueller | July 18, 1950 |